Feb. 21, 1939.  H. F. WATKINS  2,147,870
FRUIT HANDLING AND TREATING MACHINE
Filed Oct. 7, 1935   6 Sheets-Sheet 2

FIG_2_

FIG_3_

INVENTOR.
Harold F. Watkins
BY Paul D. Flehr
ATTORNEY.

Feb. 21, 1939.  H. F. WATKINS  2,147,870
FRUIT HANDLING AND TREATING MACHINE
Filed Oct. 7, 1935  6 Sheets-Sheet 6

INVENTOR.
Harold F. Watkins
BY
Paul D. Fehr
ATTORNEY.

Patented Feb. 21, 1939

2,147,870

UNITED STATES PATENT OFFICE 2,147,870

FRUIT HANDLING AND TREATING MACHINE

Harold F. Watkins, Oakland, Calif., assignor to Watkins Fruit Machinery Company, San Francisco, Calif., a corporation of California Application October 7, 1935, Serial No. 43,852

12 Claims. (Cl. 146—3)

This invention relates generally to machines for the handling of fruit, and is intended primarily for the extraction of juices from citrous fruits, such as oranges, lemons and grapefruit.

It is an object of the invention to generally improve upon fruit juice extracting machines of the type disclosed and claimed in my co-pending application, Serial Number 673,585, filed May 31, 1933, patented May 12, 1936, No. 2,040,114 of which this application is a continuation in part.

The improved features can be generally outlined as follows: The mechanism and mechanical motions utilized are greatly simplified, to facilitate manufacture, and to provide a more practical commercial machine. A more effective means is provided for presenting halved articles of fruit to the fruit handling devices, whereby the fruit is more positively centered and retained during these operations, and whereby higher operating speeds can be attained. Pneumatic means has been utilized for carrying out many of the operations, to enable quieter operation at higher capacities, and also to afford mechanical simplicity with elimination of many moving parts. Automatic provision is made for interrupting operation of the machine during periods when no fruit is being supplied, thus effecting an economy in power consumption, and saving wear and tear upon the machine. Provision is also made for insuring the presence of an inert atmosphere, like carbon dioxide, about the fruit during the juicing operation, thereby avoiding deterioration of the juice by oxidation.

Another object of the invention is to provide a vacuum cup which will be effective to securely grip articles of fruit regardless of surface irregularities, whereby the fruit or parts thereof may be presented for various operations.

Further objects and features of the invention will appear from the following description in which the preferred embodiment of the invention has been set forth in detail in conjunction with the accompanying drawings.

Referring to the drawings:

Fig. 19 is a cross sectional detail, showing a modification for the liners in the fruit engaging cups.

The present invention is characterized by the use of turretlike fruit handling devices, which grip the halves of a severed article of fruit, and then present the two halves upon rotating burrs, for a juicing operation. Following a juicing operation, the peels are expelled from the fruit handling devices, and these devices then engage the halves of a successive article of fruit, which in the meantime has been halved and properly positioned for engagement.

Referring now to the machine illustrated in the drawings, it consists of a suitable housing 10, which can be formed of non-corrodible metal like aluminum, and which serves as a mounting and housing for the majority of the working parts. The top of this housing can be provided with a hinged cover 11, to permit inspection of the fruit handling devices and their associated parts. Beneath the cover 11 there is a chamber 12 in which the juicing operation takes place, and which is defined in part by the intermediate vertical wall 13, and the laterally extending inclined shelves 14 (Fig. 6) which have their inner opposed edges joined by the trough 16. Between the shelves 14 and the intermediate wall 13, are the lower shelves 17, which have their inner edges joined by the walls of a compartment 18. An inclined duct 19 communicates between compartment 18 and the exterior of the housing, through the back housing wall 21.

The turret-like fruit handling devices are designated generally at 22 (Figs. 1 and 2) and are disposed above the shelves 14. Spaced rotatable burrs 23 are carried by the intermediate housing wall 13, and overlie the shelves 17. Mechanism for halving articles of fruit and for presenting such halved article to the turret-like fruit handling devices 22, is indicated generally at 24. The lower inclined wall of compartment 18 is provided with a screen 26, which permits juice to flow into the sump 28, from which it is removed by pipe 29.

It will be evident from the above that the fruit handling devices 22 serve to successively apply halved articles of fruit upon the rotating burrs 23, whereby juice is extracted by well known principles. Juice flows down through screen 26 and out through pipe 29, while the peels drop down into compartment 18, and are discharged from the machine through conduit 19.

The two fruit handling devices 22 are identical in construction, and can be best explained by reference to Fig. 6. Each device consists of a hollow member 31, the interior of which forms a cylinder 32. Slidably fitted in cylinder 32 there is a piston 33, which in turn is secured to the inner end of a tubular member 34. The outer end of tubular member 34 is attached to a substantially conical shaped cup 36. The rear end of each member 31 is provided with a closure block 37, while the forward end of member 31 is provided with an annular washer 38, formed of fiber or like suitable material, which serves as a guide for tube 34. Tube 34 is shown provided with an outer sheath 39, which may be of harder metal to resist wear.

Cup 36 is formed of suitable material, such as aluminum or aluminum alloy, and is provided with an inner liner 41, of resilient material, such as soft vulcanized rubber. The base of cup 36 is provided with an opening 42 which communicates with the passage through tube 34, and which makes it possible to apply pneumatic suction or pressure to the interior of the cup. For retaining the liner 41 to the cup 36, the liner is shown having an outwardly turned annular edge 43, which extends between the opposed faces of the cup 36, and the end face of tube 34. The base of the cup is also shown provided with a radially extending flange 44, for quick attachment to the hook-shaped portions 46, which in turn are secured to the outer end of tube 34.

In order to facilitate sealing engagement with the surfaces of fruit, the liner 41 is also provided with a plurality of integral flexible lips 47, which have feathered inner edges. As illustrated these lips extend annularly about the interior of the liner 41, and they are generally disposed in spaced planes parallel to the face of cup 36. Fig. 19 shows a modification of liner 41 in which the flexible lips 47a extend in a generally forward direction.

In order to pivotally mount the fruit handling device, journalling means is provided as follows: A pair of spaced vertical shafts 51 are provided, which are enclosed within the tubular casings 52. The upper ends of casings 52 are secured to the shelves 14, by suitable means such as bolts 53. Near the upper and lower ends of casings 52 ball bearing assemblies 54 and 56 are provided. The upper end of each shaft 51 is secured to a member 57, upon which the plate 58 is clamped. The member 31 of the corresponding fruit handling device is in turn clamped to plate 58, as by means of cap screws 59.

Two separate air passages extend upwardly through shaft 51, and are in communication respectively with the passage formed by tube 34, and the space 61 behind each piston 33. Thus, each shaft 51 is made hollow, to receive a concentric pipe 62. The interior of pipe 62 forms one passage, while the other passage is formed by the space 63 about this pipe. The upper end of pipe 62 is in communication with a duct 69, which is formed in the lower portion of member 31, and which in turn communicates with the duct 66 in the end closure 37. A tube 67 has its rear end mounted upon closure 37, and in communication with duct 66. This tube extends through piston 33 and into the tubular member 34, and is surrounded by a suitable packing 68, to prevent leakage between it and the piston 33. The upper end of the passage 63, is in communication with a duct 64, which in turn connects with the space 61 behind piston 33.

At the lower end of each shaft 51 there is a fitting 72, which connects with pipes 73 and 74. Each fitting 72 serves to establish communication between pipe 73 and the interior of pipe 62, and between pipe 74 and the passage 63. Pipes 73 and 74 in turn are connected with pipes 76 and 77, which lead to pneumatic valve control mechanism to be presently described.

Figures 10, 11, 12, 13, 14:
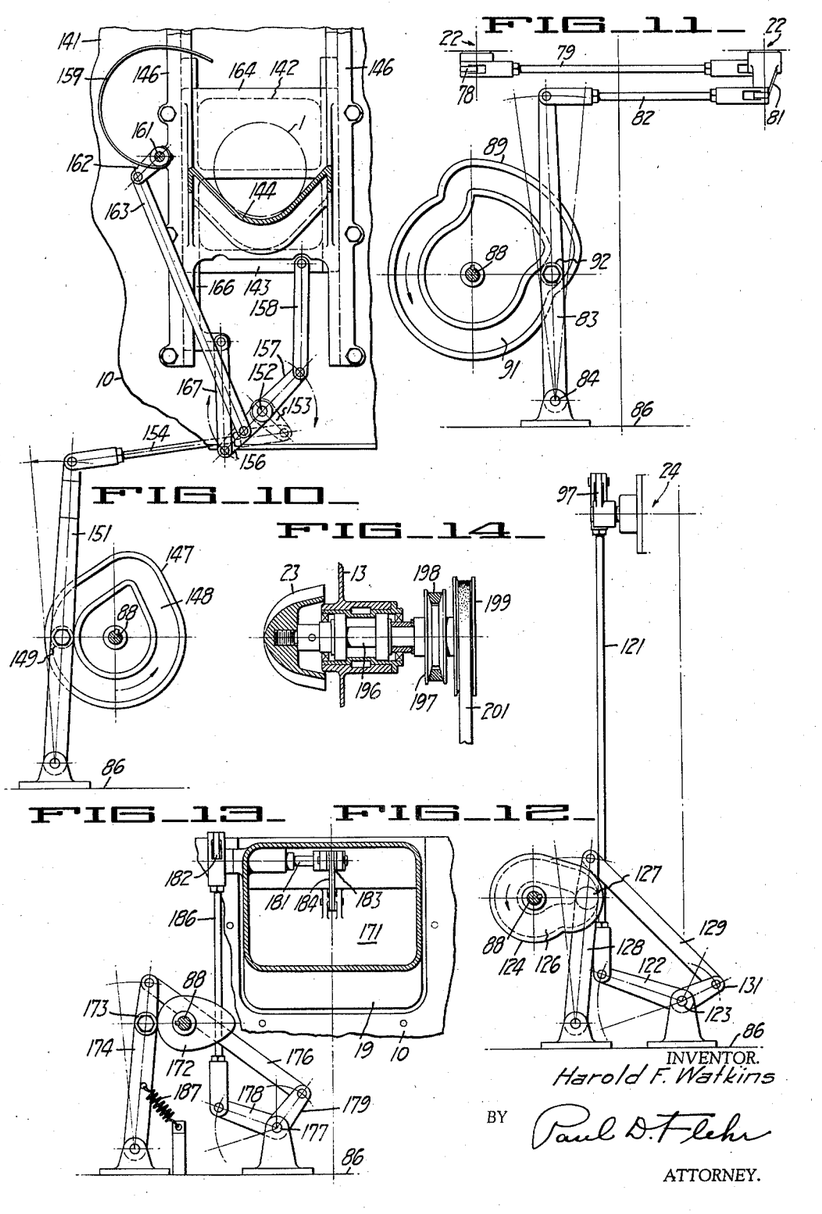
Fig. 11 is a cross sectional detail, taken along the line 11—11 of Fig. 4.
Fig. 12 is a cross sectional detail, taken along the line 12—12 of Fig. 4.
Fig. 13 is a detail, partly in cross section, illustrating the door for permitting discharge of peel together with its operating parts.
Fig. 14 is a cross sectional detail, taken along the line 14—14 of Fig. 2.

The actuating means for turning the shafts 51, to oscillate the turret-like fruit handling devices 22, can be constructed as follows:—A pair of levers 78 are attached to the lower ends of shafts 51 and these levers extend in opposite directions. For example as illustrated in Fig. 6 the left hand lever 78 extends forwardly towards the observer, while the left hand lever 78 extends in the opposite direction. The ends of these levers are connected together, by means of link 79 (Fig. 6). As shown in Fig. 11, a supplemental lever 81 is likewise secured to one of the shafts 51, and is connected to a link 82, which in turn connects to the upper end of a lever 83. The lower end of lever 83 has a pivotal mounting 84, to the bottom wall 86 of the housing. A pair of journal brackets 87 (Fig. 1) are also carried by the bottom wall 86, and serve to journal a horizontal shaft 88. A cam wheel 89 (Fig. 11) is fixed to shaft 88, and has its cam groove 91 engaged by a roller 92. Roller 92 is in turn secured to the lever 83. Thus upon rotation of shaft 88 and cam wheel 89, lever 83 is oscillated back and forth, to oscillate lever 81 and thus in turn oscillate shafts 51 and the turret-like fruit handling devices in opposite direction through substantially 90°.

The mechanism 24 for presenting halved articles of fruit to the fruit handling devices 22, is preferably constructed as follows:—A journal bearing 94 (Fig. 6) serves to support a rotatable shaft 96, one end of which is keyed to a lever 97. Likewise keyed to shaft 96, there is a collar 98, upon which a knife or cutting blade 99 is mounted. Blade 99 is formed to provide a spear shaped cutting edge 101 (Fig. 3), which is shown provided with a plurality of barbs 102. These barbs are provided with a lateral set, like the teeth of a saw, so that when the blade is engaged with an article of fruit, the article of fruit will be held impaled upon the blade, until the blade is forced completely through the fruit. Surrounding a portion of shaft 96, there is a sleeve 103 (Fig. 6), which is carried by the journal 104. An arm 106 is keyed to one end of sleeve 103, while the other end of said sleeve carries a lever 107.

Figure 3:
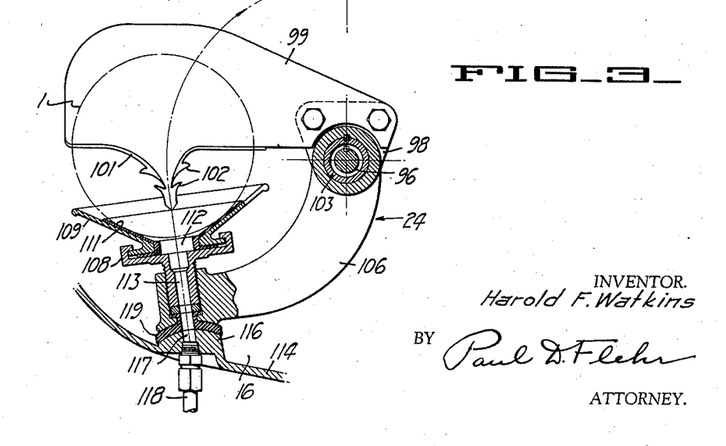
Fig. 3 is a detail, in cross section, showing mechanism for severing and successively presenting articles of fruit to the fruit handling devices.

The free end of arm 106 carries a fitting 108 which forms a detachable mounting for the fruit centering cup 109. This cup is shown provided with a liner 111 of resilient material, like soft vulcanized rubber, and a port 112 through the liner and the cup permits communication between the interior of the cup and the air duct 113. The wall 114, which immediately underlies arm 106 for the position of the parts illustrated in Fig. 3, is shown provided with a spherically surfaced boss 116, and which has an air duct 117 connected to the suction pipe 118. The arm 106 carries a pad 119, formed of suitable material such as leather or resilient rubber, which is adapted to seat upon the surface of boss 116, thus establishing communication between suction pipe 118 and the interior of cup 109, as well as to form a cushioned stop for movement of the arm 106 in a counter-clockwise direction, as viewed in Fig. 3.

A predetermined cycle of operation is established for the blade 99, and arm 106. Thus lever 97 (Fig. 12) has its free end connected to the upper end of a rod 121, the lower end of which is connected to a lever 122. This lever 122 is in turn carried by shaft 123, which is supported on the bottom wall 86. Shaft 88 carries a cam wheel 124, the cam groove 126 of which is engaged by roller 127. This roller is carried by a lever 128, the lower end of which is also pivotally supported on the bottom wall 86. A link or bar 129 connects between the upper end of lever 128, and a lever 131 which is likewise secured to shaft 123. Upon rotation of shaft 88, it is evident that lever 128 is rocked back and forth, to rock the levers 122 and 131, and thus reciprocate rod 121 to rock the lever 97 and the shaft 96 to which the blade 99 is attached. The rocking movement thus imparted to blade 99 is in a vertical plane, midway between the turret-like fruit handling devices 22, and is limited to substantially 90°.

Figures 6, 7, 8, 9, 10:
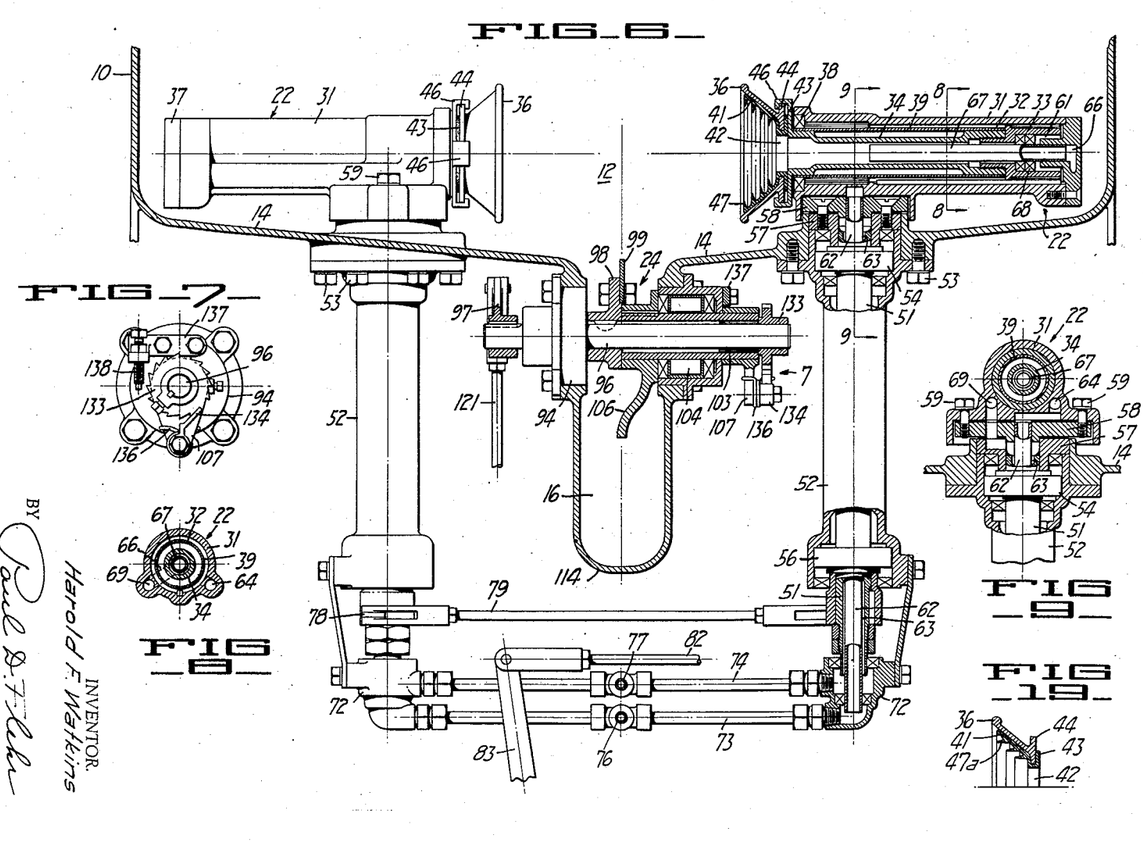
Fig. 6 is a cross sectional detail taken along the line 6—6 of Fig. 1.
Fig. 7 is a detail, viewed as indicated by arrow 7, in Fig. 6, and showing ratcheting means for operation of the fruit halving knife.
Fig. 8 is a cross sectional detail taken along the line 8—8 of Fig. 6.
Fig. 9 is a cross sectional detail taken along the line 9—9 of Fig. 6.
Fig. 10 is a detail, partly in cross section, illustrating the gate for controlling the supply of fruit to the machine, together with its operating elements, the section being indicated by the line 10—10 of Fig. 4.

For actuating the arm 106, ratcheting mechanism is interposed between shaft 96 and sleeve 103, as illustrated in Fig. 7. Keyed to one end of shaft 96 (Fig. 6) there is a ratchet wheel 133. The teeth of this ratchet wheel are engaged by a pawl 134 (Fig. 7), which is carried by arm 107, and which is urged towards engagement with the ratchet teeth by a suitable spring 136. Mounted upon a stationary support, as for example the housing of journal 104, there is a bracket 137, which carried an adjustable stop pin 138. Upon rotation of shaft 96 in a clockwise direction, as viewed in Fig. 7, it is evident that the engagement of pawl 134 with ratchet wheel 133, causes lever 107 to likewise be turned in a clockwise direction, to similarly turn the sleeve 103 and the arm 106. After such turning movement has continued for substantially 90° from the position illustrated in Fig. 7, pawl 134 is disengaged from the ratchet teeth, by abutment with stop 138, thus permitting arm 106 to swing back to its initial position as illustrated in Fig. 3, by gravity, plus the urge of a suitable spring.

To summarize at this point the operation of mechanism 24, arm 106 is in the position illustrated in Fig. 3, at the time an article of fruit (designated by numeral 1) is supplied to the cup 109. At this instance blade 99 does not interfere with entrance of an article of fruit, as it is in the process of being returned to the position illustrated in Fig. 3, from a preceding operation. Immediately after the article of fruit has centered itself in the cup 109, blade 99 descends and pierces the article of fruit. Thereafter both blade 99 and arm 106 swing in unison in a clockwise direction as viewed in Fig. 3 to substantially 90°. After reaching this limiting position arm 106 drops back to its initial position by gravity, by virtue of release of pawl 134, for the purpose of receiving a succeeding article of fruit. At substantially the instant blade 99 reaches its elevated position, the two sides of the article of fruit are engaged by the cups 36 of the fruit handling devices 22, and immediately thereafter blade 99 is again rotated in a counter-clockwise direction as viewed in Fig. 3, to force it completely through the article of fruit, and to force it down upon a succeeding article of fruit which in the meantime has been received by cup 109.

In order to feed successive articles of fruit to the cup 109, means are provided as follows: The front wall 141 of the housing (Fig. 1) is provided with an opening 142 adjacent the cup 109, and which is adapted to be opened and closed by a gate 143. A chute 144 extends outwardly from opening 142, and articles of fruit, such as oranges are supplied through this chute in single file. The side entrance of gate 143 engages a suitable guide track 146, so that the gate can be slid in a vertical plane.

In order to raise or lower the gate 143, in proper synchronism with other operations of the machine, means such as illustrated in Fig. 10 can be employed. In this instance a cam wheel 147 is employed, which is fixed to the shaft 88. The cam groove 148 of this wheel is engaged by a roller 149, which is carried by lever 151. The lower end of this lever is shown pivotally supported by the fixed bottom wall 86 of the housing. Journaled at a point below gate 143 and to the front wall 141 of the housing, there is a shaft 152, to which an arm 153 is fixed. Rod 154 serves to connect the free end of arm 153 with the upper end of lever 151. Likewise fixed to shaft 152, are the oppositely extending arms 156 and 157, with the free end of arm 157 being connected by link 158, with the lower edge of gate 143. Thus upon rocking of lever 151, responsive to rotation of shaft 88, link 158 is reciprocated to reciprocate the gate 143 in a vertical direction.

As a supplemental means for insuring feeding of articles of fruit through opening 142, one at a time, a finger 159 is provided, which is formed of suitable material such as a strip of spring metal. This finger is carried by shaft 161, to which the lever 162 is secured. A link 163 connects the free end of lever 162 with the arm 156.

Thus as the gate 143 is lowered, the free end of finger 158 is swung down into engagement with the article of fruit which follows the article being permitted to roll through the opening 142. Thus the row of fruit being supplied to the machine is held back, until the gate 143 is again raised to closed position.

In conjunction with gate 143, it is desirable to employ a supplemental gate 164, which is also slidably guided within the track 146. A depending extension 166 serves to connect gate 164 to a link 167, which in turn connects with the free end of arm 156. Thus as the gate 143 is lowered, the supplemental gate 164 is simultaneously elevated.

It is desirable to avoid entrance of atmospheric air into the compartment 12 insofar as this is possible. For this reason a hinged door 171 is provided to close the discharge end of conduit 19, and mechanism is provided for periodically opening this door, to permit discharge of peels. Thus a cam 172 (Fig. 13) is mounted upon shaft 88, and the surface of this cam is engaged by a roller 173. The roller in turn is carried by a pivoted lever 174, the upper end of which connects to a link 176. A rock shaft 177 carries the two arms 178 and 179, and the latter having its free end connected to link 176. Adjacent door 171 (Fig. 1) there is a rock shaft 181 which carries the arms 182 and 183. Link 184 serves to connect the free end of arm 183, with the door 171. The free end of arm 182 is connected to the upper end of a rod 186, the lower end of which is connected to the free end of arm 178 (Fig. 13). Thus as shaft 88 is rotated, cam 172 causes swinging of lever 174, which motion is transmitted through arms 178 and 179, to reciprocate the rod 186, and thus cause door 171 to be periodically opened and closed. A spring 187 (Fig. 13) serves to retain the roller 173 in engagement with the surface of cam 172.

A suitable electric motor 189 (Fig. 4) is shown for driving the operating parts of the machine. This motor is equipped with suitable reduction gearing 191, and its driving pulley 192 is connected to a pulley 193 on shaft 88, by means of belt 194.

Figure 2:
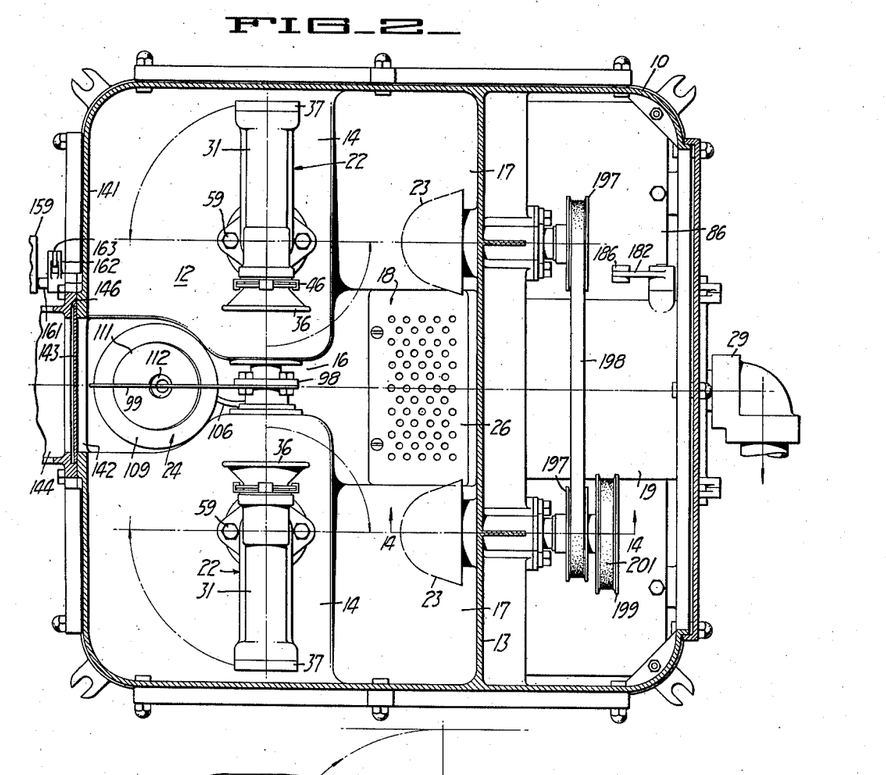
Fig. 2 is a cross sectional detail, taken along the line 2—2 of Fig. 1.

The mounting for the burrs 23, and the driving connection to the same are illustrated in Figs. 2 and 14. Thus each burr 23 is mounted upon the end of a shaft 196, which extends through the housing wall 13, and is suitably journaled thereto. The other end of each shaft 196 carries a pulley 197, and these pulleys are connected by the belt 198. One of the shafts 196 also carries a pulley 199, which is connected by belt 201, to the high speed pulley 202 on motor 189.

Figure 1:
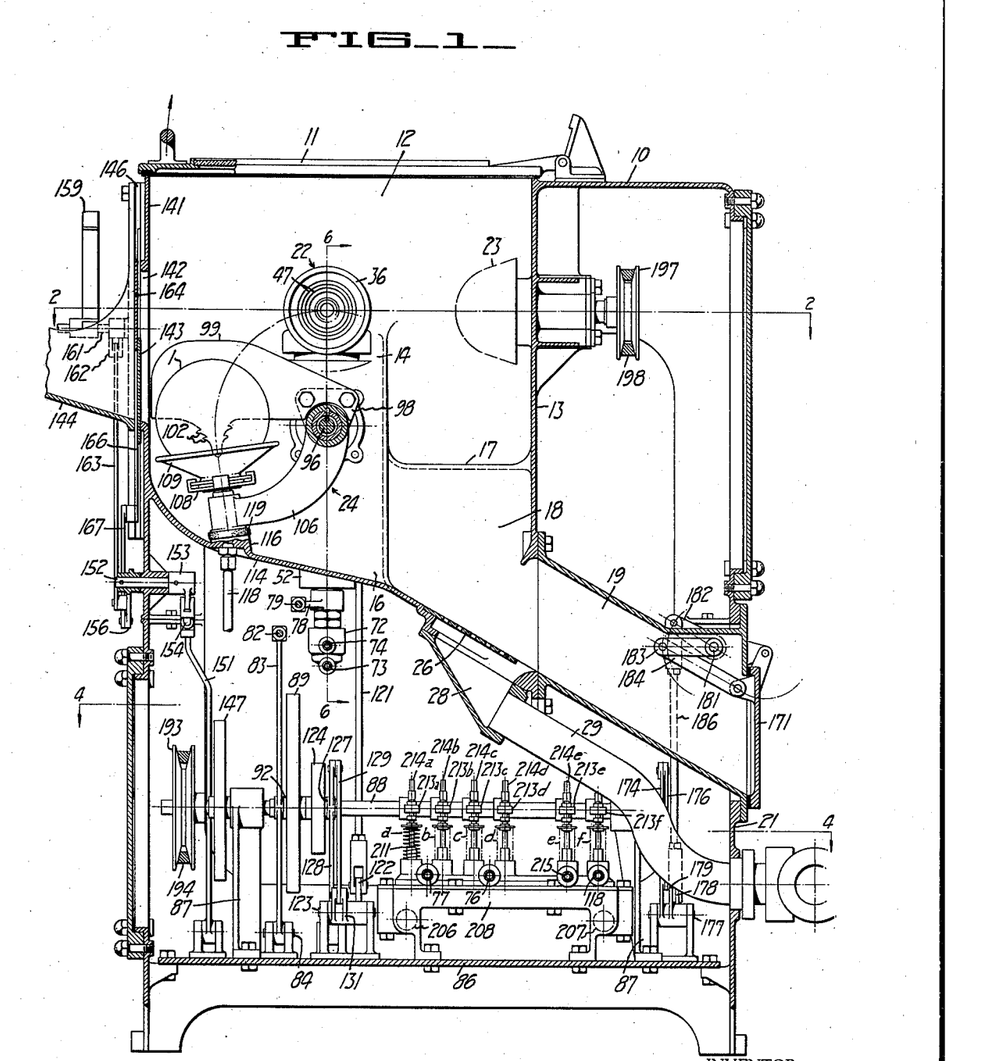
Fig. 1 is a side elevational view, in cross section, illustrating a machine incorporating the present invention.
Figure 4:
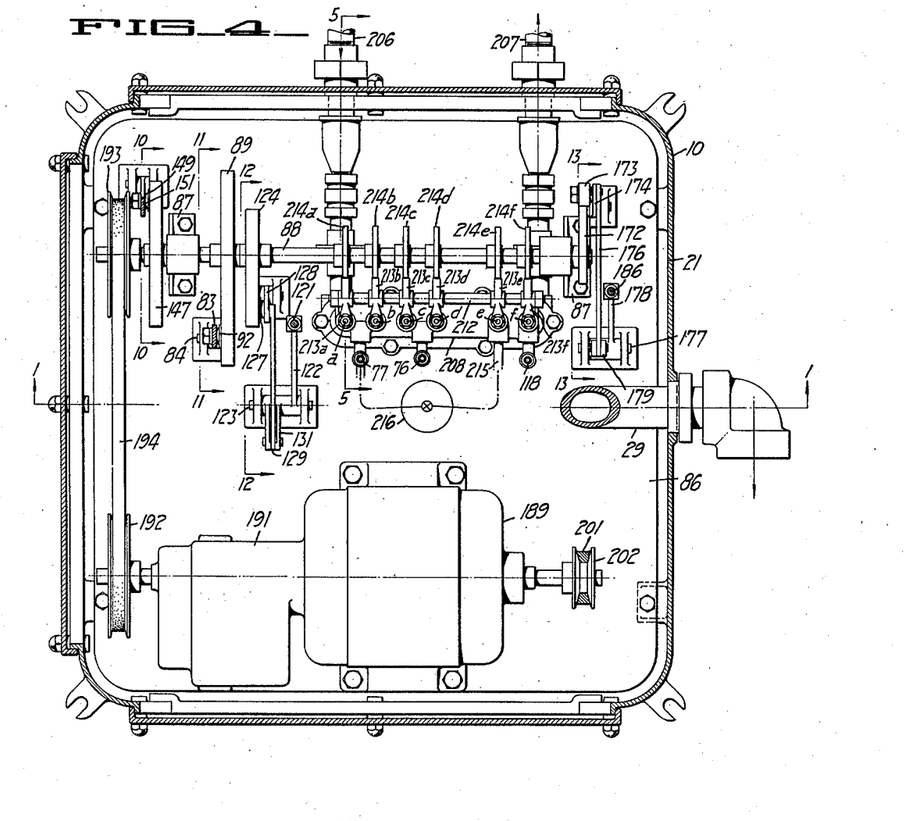
Fig. 4 is a cross sectional detail taken along the line 4—4 of Fig. 1.
Figure 5:
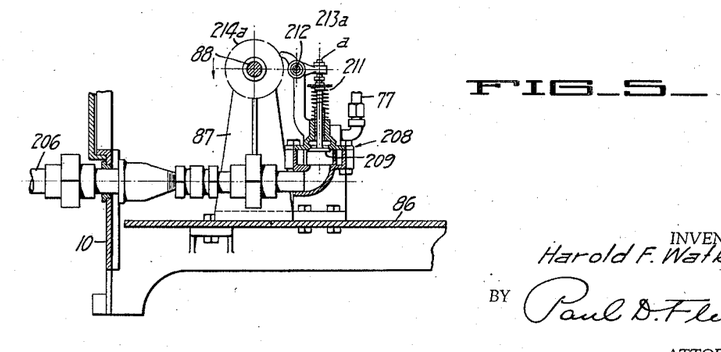
Fig. 5 is a cross sectional detail, taken along the line 5—5 of Fig. 4, and showing a part of the valve mechanism for controlling application of pneumatic pressure and suction.

The valve means utilized for controlling application of pneumatic pressure and suction to the turret-like fruit handling devices, can now be described as follows:—One pipe 206 leads from the machine, and is adapted to be connected to a suitable source of gas under pressure. A second pipe 207 extending from the machine is adapted to be connected to a suitable evacuated receiver, that is to a source of sub-atmospheric pressure. These pipes both connect to the body of a multiple valve 208 (Fig. 1), which also connect with the pipes 76, 77 and 118 (Fig. 4). This valve is provided with a number of operating stems indicated by letters a to f inclusive, (Fig. 1). Movement of each of these valve members controls movement of an associated valve member 209, (Fig. 5) and each stem is normally urged toward raised position, by means of a compression spring 211. Extending adjacent the valve stems, there is a rocker shaft 212 (Figs. 4 and 5) which carries a plurality of rocker arms indicated by the numbers 213a to 213f inclusive. One end of each rocker arm engages the upper end of its associated valve stem, while the other end of each rocker arm is adapted to engage an associated cam carried by shaft 88. These cams are designated by numerals 214a to 214f inclusive. Instead of describing in detail suitable posting for the casing of valve 208, it will suffice to point out briefly the manner in which depression of the different valve stems controls application of pneumatic pressure and suction to the pipes 76, 77 and 118. Depression of valve stem a serves to establish communication between pipe 77 and the vacuum pipe 207, thus applying a suction to pipe 77. Depression of valve stem b, while valve stem a is closed, serves to connect the pressure pipe 206 with pipe 77, thus applying pneumatic pressure to the latter. Depression of valve stem c serves to connect pipe 76 to the air pressure pipe 206. Depression of valve stem d while the stem c is closed, serves to connect pipe 76 with the evacuating pipe 207. Depression of valve stem e connects the pressure pipe 206 with a pipe 215, which in turn connects to pipe 77. Pipe 215 includes a pressure reducing regulator 216. Depression of stem f connects suction pipe 207 with the pipe 118.

It might be stated at this point that one complete cyclic operation of the machine is completed for each revolution of the shaft 88. Likewise one complete cycle of operation of the valve 208, is carried out for each complete revolution of shaft 88. Assuming that a cycle of operation of the valve 208 commences as an article of fruit, impaled upon the blade 99, is presented in elevated position between the turret-like fruit handling devices, while these devices are faced towards each other as illustrated in Fig. 2, the cycle proceeds as follows:—As shaft 88 revolves, valve stem a is first depressed to apply pneumatic pressure to pipe 77, and by virtue of the connections previously described between this pipe and the fruit handling devices, pneumatic pressure is applied to the space 61 behind the pistons 33. Thus the two cups 36 are projected into engagement with opposite sides of the fruit. Valve stem d is then depressed to apply pneumatic suction to pipe 76, and by virtue of the connections previously described to the fruit handling devices, this serves to apply suction to the interior of the cups 36 to grip the fruit. While valve stem d remains depressed, valve stem a is permitted to raise to discontinue supply of pneumatic pressure, and valve stem b is depressed, to apply pneumatic suction to pipe 77. Thus suction is applied to the spaces behind the pistons of the fruit handling devices, to cause the cups 36 to be retracted. This retraction of the cups occurs substantially simultaneously with rotation of the fruit handling devices, about the axes of shafts 51, until the devices are substantially in alignment with the axis of rotation of the burrs 23. Valve stem b is then raised to discontinue further application of suction to pipe 77, and valve stem e is depressed to again apply pressure through pipes 215 and 77, and behind pistons 33, to project cups 36, and force the two halves of fruit upon the burrs 23. The pressure applied at this time is somewhat less, by virtue of the pressure reduction afforded by the regulator 216. After the juicing operation upon the halves of fruit has been completed, valve stem e is again closed, while valve stem *b* is opened to apply suction to pipe 77 and behind pistons 23, and to retract the cups 36 from the burrs. After this retraction, or immediately following commencement of the same, the fruit handling devices are again rotated back to the initial position illustrated in Fig. 2. Likewise immediately after retraction from burrs 23 is commenced, valve stem *d* is closed to discontinue further application of suction to the interior of the cups 36, and valve stem *c* is opened, to apply pneumatic pressure to pipe 76 and to the interior of the cups 36, thus blowing away the peels of the fruit.

In the valve cycle described above, no reference has been made to operation of the stems *e* and *f* which control application of pressure and suction to pipe 118. During a part of the rotation described for shaft 88, corresponding to periods when arm 106 is in the position illustrated in Fig. 3, while stem *f* is depressed to apply suction to pipe 118, and thus cause cup 109 to more effectively center an article of fruit, fed into the machine through opening 142. It has been found that such provision for applying suction to cup 109 is not essential, although it is desirable in some instances.

Operation of the machine can now be revised in entirety. An ample supply of fruit such as oranges, is supplied to the machine, with the fruit being in single file within the chute 144. Assuming that the motor of the machine is in operation, the actuating means for the gates 143 and 164 is so co-ordinated that gate 143 is lowered, and gate 164 raised to permit an article of fruit to drop within the cup 109 (Fig. 1), where the fruit is centered with respect to the plane of the blade 99. Gates 143 and 164 immediately close and the blade or knife 99, swings downwardly and is impaled upon the fruit substantially as illustrated in Fig. 1. Both arm 106 and knife 99 now swing upwardly in unison, to carry the orange into a position between the turret-like fruit handling devices 22. The cups 36 are now projected outwardly upon opposite sides of the article of fruit, and hold fast to the sides of the fruit, by suction. During this short interval arm 106 is dropping back to its initial position to receive a succeeding article of fruit. Immediately upon engagement of the cups 36 with the sides of the fruit, knife 99 is again swung downwardly to pass completely through the fruit, thus completing halving of the same. The cups 36 are now retracted in opposite directions, and together with such retracting movement, the turret-like fruit handling devices swing about the pivotal axes of shafts 51, until they are in alignment with the axes of rotation of burrs 23. As they reach this limiting position, pneumatic pressure projects the two cups 36 to cause the two halves of the fruit to be resiliently pressed upon the burrs. When the juicing operation has been completed, pneumatic suction causes retraction of the cups 36, to free the peel from the burrs, and during such retraction pneumatic pressure is applied to the interior of the cups to expel the peels. Likewise while retraction of the cups is being completed, the fruit handling devices are again being rotated back to their initial positions illustrated in Fig. 2. By that time a succeeding article of fruit has been impaled by knife 99 and has been elevated to a position between the fruit handling devices. For each complete cycle of operation of the fruit handling devices, door 171 is swung open to permit peels to be ejected. Juice removed from the fruit flows downwardly through screen 26, and is removed through pipe 29.

Figure 15:
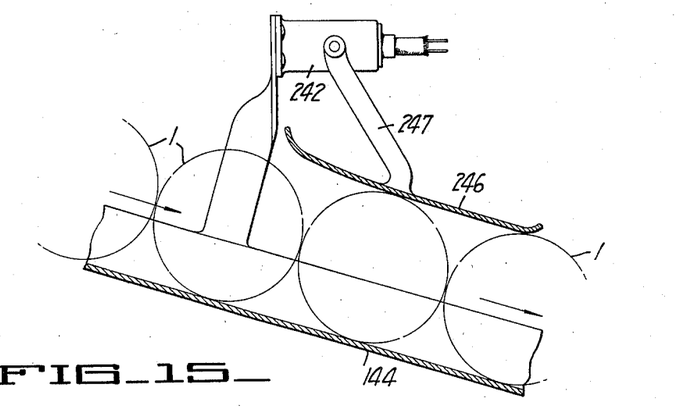
Fig. 15 is a side elevational detail, partly in cross section, illustrating electrical contacting means for automatically discontinuing operation of the machine, in the event no fruit is being supplied thereto.
Figures 16, 17:
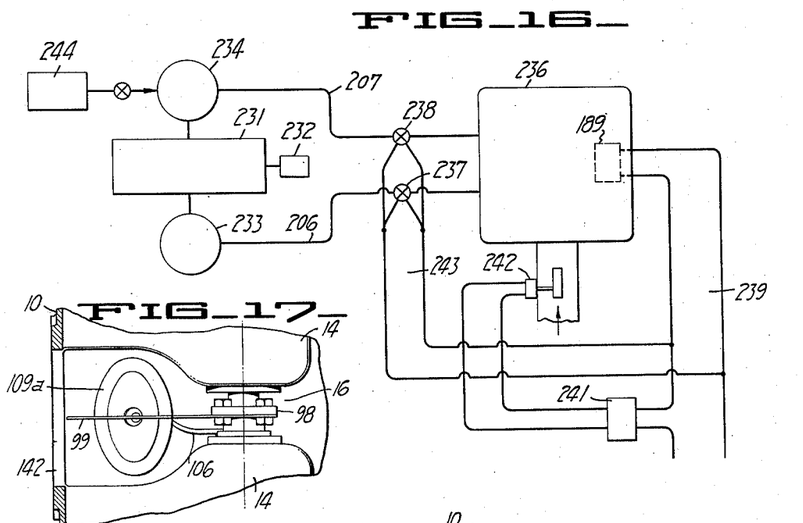
Fig. 16 is a diagrammatic layout, illustrating a compressor and other parts of a plant equipment incorporating the machine.
Fig. 17 is a plan detail, partly in cross section, showing a modified form of centering cup, to be used when the machine is employed for extracting juice from lemons.

An advisable layout utilized with my machine with a compressor unit, is illustrated in Fig. 16. In this case a compressor 231, driven by a motor 232, has its discharge and suction sides connected respectively to pressure and suction tanks 233 and 234. The pressure line 206 from machine 236 connects with the pressure tank 233, while the suction pipe line 207 connects with the suction tank 234. Solenoid control valves 237 and 238, are provided in lines 206 and 207, and to close these lines during periods when the machine is not operating. The circuit 239 for the motor 189, is shown being controlled by starter switch 241, which in addition to the usual manual control, is shown being controlled by switch 242. Likewise circuit 243 for the solenoid valves 237 and 238 is shown being connected across circuit 239 for the motor. A source of inert gas, such as carbon dioxide, is represented at 244, with a small stream of this gas being bled into the suction tank 234. By this method, the pneumatic system is kept filled with the carbon dioxide, rather than air, and a substantially undiluted atmosphere of carbon dioxide is maintained within the compartment 12 of the machine. Thus the juice is contacted only with inert gas, and is not subject to deterioration by virtue of contact with oxygen of the atmosphere. Similar results can be accomplished by supplying carbon dioxide to the pressure tank 233, or by supplying a stream of carbon dioxide directly to the compartment 12. Switch 242 can be controlled in accordance with the supply of fruit to the machine. As shown in Fig. 15, a fruit engaging member 246 can be arranged to overlie the chute 144, at a point near the machine. This member is shown being carried by an arm 247, which operates switch 242. When chute 144 is filled with oranges, member 246 is held elevated, to maintain the contacts of switch 242 closed. However, when the supply of fruit to the machine is discontinued, member 246 is permitted to drop, to open the switch contacts, and thus interrupt further operation of the machine and to close valves 237 and 238. Such an arrangement is particularly desirable where a battery of my machines is operating in conjunction with a common compressor. In such an installation different grades of fruit may be supplied to different machines, and during grading operations, one or more machines may not be continuously supplied with fruit. With an installation such as described, such machines will be immediately shut down until they are again supplied with fruit.

In installing a battery of machines, in conjunction with a common compressor, some provision should be made to insure application of a proper degree of pressure to each machine, irrespective of the number of the machines in the battery which are operating. This can be readily accomplished by the use of suitable pressure regulators, for controlling the pressure and suction supplied to each machine individually.

Figure 18:
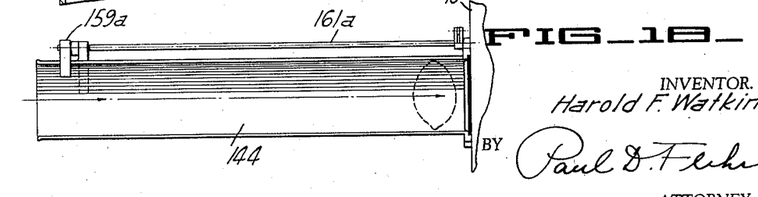
Fig. 18 is a plan detail, likewise showing a modification of feed means for the machine, when the machine is being used for extracting juice from lemons.

The centering cup 109 which has previously been described, is suitable for handling fruit which is generally spherical shaped, as for example oranges or grapefruit. When handling lemons, it is desirable to employ an elliptically contoured cup 109a, such as illustrated in Fig. 17. To enable proper use of such a centering cup, means should also be provided whereby the lemons are dropped into the centering cup with their axes substantially parallel to the major axes of the ellipse. This can be accomplished by means such as illustrated in Fig. 18. In this instance in place of locating the fruit engaging finger 159 relatively close to the gates 143 and 164, shaft 161 is extended, as represented by shaft 161a in Fig. 18, to carry the finger 159a a substantial distance from the gates 143 and 164, as for example a distance of thirty inches or more. With such an arrangement, each lemon is permitted to roll free after being released by finger 159a, until it strikes the gate 143. During this free rolling period, through the substantially V-shaped trough 144, the lemon tends to assume a position such as illustrated by dotted lines in Fig. 18, with its axes substantially horizontal and extending laterally with respect to the longitudinal axis of the trough.

It will be evident that the machine described has many desirable features and characteristics. The mechanism utilized to secure the necessary mechanical movements, is relatively simple. Such simplicity is largely made possible because of the use of pneumatic means in operating the turret-like fruit handling devices. The use of suction cups for gripping and retaining the halves of the fruit during the juicing operation, prevents bending or pinching of the peel, such as would tend to expel peel oil, which is known to be detrimental to the desired juices. Likewise any oil which may be extracted from the peel during operation of the machine, is retained by the vacuum cups, rather than to be intermingled directly with the juices. The vacuum cups conform to irregularities of the fruit, thus insuring a fast grip at all times. The use of pneumatic means for pressing the halves of the fruit upon the burrs, is superior to positive mechanical movements for this purpose, because a proper regulated pressure can be obtained, which will cause proper extraction of the juice without undue mutilation of the peel. The machine is capable of withstanding heavy duty service in packing and processing plants, with a minimum of service and maintenance costs.

The subject matter disclosed but not claimed herein is disclosed and claimed in my copending applications Serial Number 119,971, filed January 11, 1937, and Serial Number 145,765, filed June 1, 1937.

I claim:

1. In a fruit handling machine of the character described, a fruit handling device comprising a cup adapted to engage one side of an article of fruit, a rotatable burr, and pneumatic means for projecting and retracting the cup with respect to the burr, said device including two parts retained together for sliding movement along a common linear axis, the cup being mounted upon one of said parts, means for securing the other one of said parts to a fixed support for swinging movement about an axis substantially at right angles to said first mentioned axis, and pneumatic means for causing relative sliding movement between said parts to project and retract said cup with respect to said support.

2. In a fruit handling machine of the character described, a member forming a cylinder, a piston slidably fitted within said cylinder, a cup secured to said piston and adapted to engage one side of an article of fruit, means serving to pivotally support said cylinder for swinging movement about an axis substantially at right angles to the axis of the cylinder, and means for supplying varying pneumatic pressures to said cylinder to effect projection and retraction of said cup with respect to the cylinder.

3. In a fruit handling machine of the character described, a member forming a cylinder, a piston slidably fitted within said cylinder, a cup secured to said piston and adapted to engage one side of an article of fruit, means serving to pivotally carry said cylinder for swinging movement about a pivotal axis substantially at right angles to the axis of said cylinder, means for cyclically oscillating said cylinder together with the piston and the cup about said pivotal axis, means for alternately applying pneumatic pressure and suction to said cylinder to effect projecting and retraction of said cup in synchronism with said oscillating movement, and means for intermittently applying pneumatic suction to the interior of said cup in synchronism with said oscillating movement.

4. In a fruit handling machine of the character described, a member forming a cylinder, a piston slidably fitted within said cylinder, a cup secured to said piston and adapted to engage one side of an article of fruit, the space on one side of the piston being adapted to receive varying pneumatic pressures to effect movement of the piston in opposite directions to project and retract the cup with respect to the cylinder, means serving to pivotally mount said cylinder for oscillating movement about an axis substantially at right angles to the axis of the cylinder, and means including a duct extending concentrically with said last named axis for applying varying pneumatic pressures to said space.

5. In a fruit handling machine of the character described, a member forming a cylinder, a piston slidably fitted within said cylinder, a tube extending into one end of said cylinder and having its inner end secured to said piston, a cup secured to the outer end of said tube and adapted to engage one side of an article of fruit, the interior of said cup being in communication with the passage in said tube, means for applying varying pneumatic pressures to said cylinder to effect movement of said piston in opposite directions, to project and retract said cup with respect to the cylinder, and separate means for applying varying pneumatic pressures to the interior of the cup, said last means including a communicating tube disposed concentrically with respect to the axis of the cylinder and extending through said piston into said first mentioned tube.

6. In a fruit handling machine of the character described, a pair of fruit handling devices, means for mounting said devices for swinging movement about spaced parallel axes, said axes being substantially equally spaced from a plane which is perpendicular to the common plane of the axes and which is also parallel to said axes, an arm mounted for swinging movement through said first named plane, a fruit receiving and centering cup mounted on said arm, a cutting blade likewise mounted for swinging movement through said plane and adapted to sever an article of fruit carried by said cup, and means for effecting cyclic actuation of said arm and said blade, whereby said blade is first swung to impale an article of fruit carried by said cup, after which both said arm and said blade are swung to present the partially halved article of fruit to said fruit handling devices, after which said arm is returned to its initial position to receive a succeeding article of fruit and said blade is swung to pass completely through the fruit.

7. In a fruit handling machine of the character described, an arm mounted for swinging movement in a vertical plane, a fruit receiving and centering cup carried by the free end of said arm, the cup in one limiting position of the arm being faced upwardly to receive an article of fruit, and in the other position of the arm being elevated to prevent the article of fruit for subsequent operations, a blade likewise mounted for swinging movement in said plane, and means for cyclically actuating said arm and said blade, whereby said blade is first swung downwardly upon an article of fruit carried by the cup while the cup is in said first mentioned limiting position, after which both the arm and said blade are swung upwardly to carry the fruit to said position of presentation, and after which said arm is permitted to drop back to said initial position whereby the cup may receive a succeeding article of fruit.

8. In a fruit handling machine of the character described, an arm mounted for swinging movement in a vertical plane a fruit receiving and centering cup carried by the free end of said arm, the cup in one limiting position of the arm being faced upwardly to receive an article of fruit, and in the other position of the arm being elevated to present the article of fruit for subsequent operations, a blade likewise mounted for swinging movement in said plane, and means for cyclically actuating said arm and said blade, whereby said blade is first swung downwardly upon an article of fruit carried by the cup while the cup is in said first mentioned limiting position, after which both the arm and said blade are swung upwardly to carry the fruit to said position of presentation, and after which said arm is permitted to drop back to said initial position whereby the cup may receive a succeeding article of fruit and said blade is again swung downwardly.

9. In a fruit handling machine of the character described, a pair of members forming cylinders, a piston slidably fitted within each of said cylinders, a cup secured to each of said pistons and adapted to engage one side of an article of fruit, means for mounting said cylinders for oscillating movement about spaced parallel axis, the limiting positions of such oscillating movement being such that for one limiting position the axes of said cylinders are in alignment and said cups are faced towards each other, and for the other limiting position the axes of said cylinders are substantially parallel while said cups are faced in the same direction, means for successively presenting halved articles of fruit to a position between said cups, while said cups are in said first limiting position, a pair of spaced rotatable burrs, said burrs being in alignment with said cups when said cups are in said second limiting position, actuating means for causing cyclic oscillating movement of said cylinders between said limiting positions, and means for alternately applying pneumatic pressure and suction to said cylinders in synchronism with such oscillating movement, whereby said cups are projected upon the halved articles of fruit presented to the same, after which said cups are retracted in opposite directions, and then again projected to present said halved articles of fruit upon said burrs, after said cylinders have been swung to positions in alignment with said burrs.

10. In a fruit handling machine of the character described, a member forming a cylinder, a piston slidably fitted within said cylinder, a cup secured to said piston and adapted to engage one side of an article of fruit, means serving to pivotally support said cylinder for swinging movement about an axis substantially at right angles to the axis of the cylinder, means for applying pneumatic pressure to said cylinder to effect projection of said cup with respect to the cylinder, and means to effect retraction of the cup with respect to the cylinder.

11. In a fruit handling machine of the character described, a member forming a cylinder, a piston slidably fitted within said cylinder, a cup secured to said piston and adapted to engage one side of an article of fruit, the space on one side of the piston being adapted to receive varying pneumatic pressures to effect reciprocating movements of the piston, means serving to pivotally mount said cylinder for oscillating movement about an axis substantially at right angles to the axis of the cylinder, and means including a duct extending concentrically with said last named axis for applying pneumatic pressure to said space.

12. In a machine for extracting juice from articles of fruit like oranges, lemons, grapefruit and the like, a pneumatic fruit gripping device, a closed housing surrounding said device, means connected to said device for intermittently applying pneumatic suction to the same, and means connected to said device for intermittently applying carbon dioxide gas under pressure to the same, whereby fruit gripped by said device is released and whereby an atmosphere of carbon dioxide is maintained within said housing.

HAROLD F. WATKINS.